US007628703B2

(12) United States Patent
Wolf et al.

(10) Patent No.: US 7,628,703 B2
(45) **Date of Patent: *Dec. 8, 2009**

(54) CENTRAL DETERMINATION GAMING SYSTEM WITH A GAMING TERMINAL ASSISTING THE CENTRAL CONTROLLER IN THE GENERATION OF A GAME OUTCOME

(75) Inventors: Bryan D. Wolf, Reno, NV (US); Richard E. Michaelson, Reno, NV (US)

(73) Assignee: IGT, Reno, NV (US)

( * ) Notice: Subject to any disclaimer, the term of this patent is extended or adjusted under 35 U.S.C. 154(b) by 854 days.

This patent is subject to a terminal disclaimer.

(21) Appl. No.: 10/431,755

(22) Filed: May 8, 2003

(65) Prior Publication Data

US 2004/0224770 A1 Nov. 11, 2004

(51) Int. Cl.
*A63F 9/24* (2006.01)
*A63F 13/12* (2006.01)

(52) U.S. Cl. ............................ 463/42; 463/22; 463/25; 463/29

(58) Field of Classification Search .................. 463/16, 463/17, 20, 22, 42
See application file for complete search history.

(56) References Cited

U.S. PATENT DOCUMENTS 4,157,829 A 6/1979 Goldman et al.
4,332,389 A 6/1982 Loyd et al.
4,335,809 A 6/1982 Wain
4,339,798 A 7/1982 Hedges et al.
4,365,810 A 12/1982 Richardson
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,527,798 A 7/1985 Siekierski et al.

(Continued)

FOREIGN PATENT DOCUMENTS

GB 2 374 294 A 10/2002

(Continued)

OTHER PUBLICATIONS

Lucky Times Californis Lottery Newsletter published 1996.

(Continued)

*Primary Examiner*—Dmitry Suhol
*Assistant Examiner*—Andrew Kim
(74) *Attorney, Agent, or Firm*—K&L Gates LLP

(57) ABSTRACT

A central determination gaming system with a gaming terminal assisting a central controller in the generation of a game outcome. In one embodiment of the present invention, upon a player initiating a game play at one of a plurality of gaming terminals, the processor of the gaming terminal generates a random number. The generated random number is communicated to the central controller. The central controller uses the generated random number to select an available game outcome from a set or pool of predetermined game outcomes. The central controller marks or flags the selected game outcome in the pool as unavailable for subsequent selections and communicates the selected game outcome to the gaming terminal. The gaming terminal then provides the player the game outcome with the associated value, if any, for the selected game outcome.

44 Claims, 6 Drawing Sheets

U.S. PATENT DOCUMENTS

| | | | | |
|---|---|---|---|---|
| 4,582,324 | A | 4/1986 | Koza et al. | |
| 4,624,462 | A | 11/1986 | Itkis | |
| 4,636,951 | A | 1/1987 | Harlick | |
| 4,652,998 | A | 3/1987 | Koza et al. | |
| 4,669,730 | A | 6/1987 | Small | |
| 4,679,143 | A | 7/1987 | Hagiwara | |
| 4,689,742 | A | 8/1987 | Troy et al. | |
| 4,798,387 | A | 1/1989 | Richardson | |
| 4,805,907 | A | 2/1989 | Hagiwara | |
| 4,815,741 | A | 3/1989 | Small | |
| 4,817,951 | A | 4/1989 | Crouch et al. | |
| 4,842,278 | A | 6/1989 | Markowicz | |
| 4,848,771 | A | 7/1989 | Richardson | |
| 4,856,787 | A | 8/1989 | Itkis | |
| 4,880,237 | A | 11/1989 | Kishishita | |
| 4,882,473 | A | 11/1989 | Bergeron et al. | |
| 4,982,337 | A | 1/1991 | Burr et al. | |
| 5,007,649 | A | 4/1991 | Richardson | |
| 5,042,809 | A | 8/1991 | Richardson | |
| 5,092,598 | A | 3/1992 | Kamille | |
| 5,100,139 | A | 3/1992 | Di Bella | |
| 5,119,295 | A | 6/1992 | Kapur | |
| 5,158,293 | A | 10/1992 | Mullins | |
| 5,223,698 | A | 6/1993 | Kapur | |
| 5,265,874 | A | 11/1993 | Dickinson et al. | |
| 5,275,400 | A | 1/1994 | Weingardt et al. | |
| 5,276,312 | A | 1/1994 | McCarthy | |
| 5,282,620 | A | 2/1994 | Keesee | |
| 5,297,802 | A | 3/1994 | Pocock et al. | |
| 5,324,035 | A | 6/1994 | Morris et al. | |
| 5,326,104 | A | 7/1994 | Pease et al. | |
| 5,348,299 | A | 9/1994 | Clapper, Jr. | |
| 5,351,970 | A | 10/1994 | Fioretti | |
| 5,377,975 | A | 1/1995 | Clapper, Jr. | |
| 5,393,061 | A | 2/1995 | Manship et al. | |
| 5,398,932 | A | 3/1995 | Eberhardt et al. | |
| 5,407,199 | A | 4/1995 | Gumina | |
| 5,476,259 | A | 12/1995 | Weingardt | |
| 5,487,544 | A | 1/1996 | Clapper, Jr. | |
| 5,536,008 | A | 7/1996 | Clapper, Jr. | |
| 5,542,669 | A | 8/1996 | Charron et al. | |
| 5,562,284 | A | 10/1996 | Stevens | |
| 5,564,701 | A | 10/1996 | Dettor | |
| 5,580,311 | A | 12/1996 | Haste, III | |
| 5,586,937 | A | 12/1996 | Menashe | |
| 5,595,538 | A | 1/1997 | Haste, III | |
| 5,609,337 | A | 3/1997 | Clapper, Jr. | |
| 5,628,684 | A | 5/1997 | Bouedec | |
| 5,630,754 | A | 5/1997 | Rebane | |
| 5,645,485 | A | 7/1997 | Clapper, Jr. | |
| 5,657,899 | A | 8/1997 | Stoken | |
| 5,674,128 | A | 10/1997 | Holch et al. | |
| 5,697,843 | A | 12/1997 | Manship et al. | |
| 5,720,483 | A | 2/1998 | Trinh | |
| 5,735,432 | A | 4/1998 | Stoken et al. | |
| 5,749,784 | A | 5/1998 | Clapper, Jr. | |
| 5,779,545 | A * | 7/1998 | Berg et al. | 463/22 |
| 5,779,547 | A | 7/1998 | SoRelle et al. | |
| 5,800,269 | A | 9/1998 | Holch et al. | |
| 5,810,664 | A | 9/1998 | Clapper, Jr. | |
| 5,830,067 | A | 11/1998 | Graves et al. | |
| 5,855,515 | A | 1/1999 | Pease et al. | |
| 5,871,398 | A | 2/1999 | Schneier et al. | |
| 5,876,283 | A | 3/1999 | Parra et al. | |
| 5,882,260 | A | 3/1999 | Marks et al. | |
| 5,915,588 | A | 6/1999 | Stoken et al. | |
| 5,928,082 | A | 7/1999 | Clapper, Jr. | |
| 5,941,771 | A | 8/1999 | Haste, III | |
| 5,944,606 | A | 8/1999 | Gerow | |
| 5,949,042 | A | 9/1999 | Dietz, II et al. | |
| 5,954,582 | A | 9/1999 | Zach | |
| 5,970,143 | A | 10/1999 | Schneier et al. | |
| 5,980,385 | A | 11/1999 | Clapper, Jr. | |
| 5,984,779 | A | 11/1999 | Bridgeman et al. | |
| 6,012,984 | A | 1/2000 | Roseman | |
| 6,017,032 | A | 1/2000 | Grippo et al. | |
| 6,024,640 | A | 2/2000 | Walker et al. | |
| 6,056,289 | A | 5/2000 | Clapper, Jr. | |
| 6,062,981 | A | 5/2000 | Luciano, Jr. | |
| 6,079,711 | A | 6/2000 | Wei et al. | |
| 6,089,982 | A | 7/2000 | Holch et al. | |
| 6,093,100 | A | 7/2000 | Singer et al. | |
| 6,099,408 | A | 8/2000 | Schneier et al. | |
| 6,117,009 | A | 9/2000 | Yoseloff | |
| 6,120,024 | A | 9/2000 | Lind | |
| 6,146,272 | A | 11/2000 | Walker et al. | |
| 6,155,925 | A | 12/2000 | Giobbi et al. | |
| 6,159,095 | A | 12/2000 | Frohm et al. | |
| 6,168,521 | B1 | 1/2001 | Luciano et al. | |
| 6,174,233 | B1 | 1/2001 | Sunaga et al. | |
| 6,183,361 | B1 | 2/2001 | Cummings et al. | |
| 6,210,275 | B1 | 4/2001 | Olsen | |
| 6,210,276 | B1 | 4/2001 | Mullins | |
| 6,217,448 | B1 | 4/2001 | Olsen | |
| 6,220,961 | B1 | 4/2001 | Keane et al. | |
| 6,241,606 | B1 | 6/2001 | Riendeau et al. | |
| 6,250,685 | B1 | 6/2001 | Walker et al. | |
| 6,254,480 | B1 | 7/2001 | Zach | |
| 6,273,820 | B1 | 8/2001 | Haste, III | |
| 6,280,325 | B1 | 8/2001 | Fisk | |
| 6,280,328 | B1 | 8/2001 | Holch et al. | |
| 6,302,791 | B1 | 10/2001 | Frohm et al. | |
| 6,306,038 | B1 | 10/2001 | Graves et al. | |
| 6,309,298 | B1 | 10/2001 | Gerow | |
| 6,315,289 | B1 | 11/2001 | Sakamoto et al. | |
| 6,325,716 | B1 | 12/2001 | Walker et al. | |
| 6,358,150 | B1 | 3/2002 | Mir et al. | |
| 6,358,151 | B1 | 3/2002 | Enzminger et al. | |
| 6,368,218 | B2 | 4/2002 | Angell, Jr. | |
| 6,386,977 | B1 | 5/2002 | Hole | |
| 6,402,614 | B1 | 6/2002 | Schneier et al. | |
| 6,419,583 | B1 | 7/2002 | Crumby et al. | |
| 6,443,837 | B1 | 9/2002 | Jaffe et al. | |
| 6,447,395 | B1 | 9/2002 | Stevens | |
| 6,450,885 | B2 | 9/2002 | Schneier et al. | |
| 6,454,648 | B1 | 9/2002 | Kelly et al. | |
| RE37,885 | E | 10/2002 | Acres et al. | |
| 6,471,591 | B1 | 10/2002 | Crumby | |
| 6,475,086 | B2 | 11/2002 | Zach | |
| 6,508,711 | B1 | 1/2003 | Ono | |
| 6,524,184 | B1 | 2/2003 | Lind et al. | |
| 6,524,185 | B2 | 2/2003 | Lind | |
| 6,527,638 | B1 | 3/2003 | Walker et al. | |
| 6,533,664 | B1 | 3/2003 | Crumby | |
| 6,537,150 | B1 | 3/2003 | Luciano et al. | |
| 6,569,017 | B2 | 5/2003 | Enzminger et al. | |
| 6,599,187 | B2 | 7/2003 | Gerow | |
| 6,656,040 | B1 | 12/2003 | Brosnan et al. | |
| 6,656,044 | B1 | 12/2003 | Lewis | |
| 6,729,961 | B1 | 5/2004 | Millerschone | |
| 6,749,500 | B1 | 6/2004 | Nelson et al. | |
| 6,908,391 | B2 * | 6/2005 | Gatto et al. | 463/42 |
| 2002/0010013 | A1 | 1/2002 | Walker et al. | |
| 2002/0039917 | A1 | 4/2002 | Armstrong et al. | |
| 2002/0072404 | A1 | 6/2002 | Gerow | |
| 2002/0077173 | A1 | 6/2002 | Luciano et al. | |
| 2002/0077174 | A1 | 6/2002 | Luciano et al. | |
| 2002/0082070 | A1 | 6/2002 | Macke et al. | |
| 2002/0082071 | A1 | 6/2002 | Riendeau et al. | |
| 2002/0082085 | A1 | 6/2002 | Osterer | |
| 2002/0090986 | A1 | 7/2002 | Cote et al. | |
| 2002/0094871 | A1 | 7/2002 | Luciano et al. | |
| 2002/0098882 | A1 | 7/2002 | Lind et al. | |
| 2002/0098883 | A1 | 7/2002 | Packes, Jr. et al. | |

| | | | |
|---|---|---|---|
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0132661 | A1 | 9/2002 | Lind et al. |
| 2002/0132666 | A1 | 9/2002 | Lind et al. |
| 2002/0169018 | A1 | 11/2002 | Schneier et al. |
| 2003/0100371 | A1 | 5/2003 | Gatto et al. |
| 2003/0100372 | A1 | 5/2003 | Gatto et al. |
| 2003/0125101 | A1 | 7/2003 | Campo |
| 2003/0181231 | A1 | 9/2003 | Vancura et al. |
| 2003/0193136 | A1 | 10/2003 | Walker et al. |
| 2003/0211884 | A1 | 11/2003 | Gauselmann |
| 2004/0235559 | A1 * | 11/2004 | Brosnan et al. ............... 463/22 |
| 2007/0129131 | A1 | 6/2007 | Kaminkow et al. |

FOREIGN PATENT DOCUMENTS

| | | |
|---|---|---|
| WO | WO 00/67424 | 11/2000 |
| WO | WO 02/097749 A2 | 12/2002 |

OTHER PUBLICATIONS

Instant Winner Advertisement by Williams/WMS Gaming, published prior to 2002.

* cited by examiner

CENTRAL DETERMINATION GAMING SYSTEM WITH A GAMING TERMINAL ASSISTING THE CENTRAL CONTROLLER IN THE GENERATION OF A GAME OUTCOME

CROSS-REFERENCE TO RELATED APPLICATIONS

This application relates to the following co-pending commonly owned patent applications: "GAMING DEVICE INCLUDING OUTCOME POOLS FOR PROVIDING GAME OUTCOMES," Ser. No. 10/261,744; "APPARATUS AND METHOD FOR GENERATING A POOL OF SEEDS FOR A CENTRAL DETERMINATION GAMING SYSTEM," Ser. No. 10/371,722; "CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME," Ser. No. 10/371,723; "CENTRAL DETERMINATION GAMING SYSTEM WHERE THE SAME SEED IS USED TO GENERATE THE OUTCOMES FOR A PRIMARY GAME AND A SECONDARY GAME," Ser. No. 10/371,958; "CENTRAL DETERMINATION GAMING SYSTEM WHICH PROVIDES A PLAYER A CHOICE IN OUTCOMES," Ser. No. 10/442,318; "CENTRAL DETERMINATION GAMING SYSTEM WITH A GAME OUTCOME GENERATED BY A GAMING TERMINAL AND APPROVED BY A CENTRAL CONTROLLER," Ser. No. 10/383,423; and "CENTRAL DETERMINATION SYSTEM WITH A KENO GAME." Ser. No. 10/601,482.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a central determination gaming system, and more particularly to a central determination gaming system with a gaming terminal assisting the central controller in the generation of a game outcome. The majority of the contemporary wagering gaming devices or gaming terminals, such as slot machines, randomly generate awards and other outcomes. Such gaming terminals typically include a relatively low probability associated with obtaining the highest award, relatively medium probabilities associated with obtaining medium range awards and relatively higher probabilities associated with obtaining low range awards. These gaming terminals also include probabilities associated with obtaining losses or no award at all. For example, a 3-reel probability based slot machine may generate three random numbers. The first random number is used to determine the stop position of the first reel. The second random number is used to determine the stop position of the second reel. The third random number is used to determine the stop position of the third reel. The slot machine then compares the stopped reel combination to a pay table or other stored data to determine the award or other outcome. The probabilities of obtaining the awards and the amount of the awards determine the average expected pay out percentage of these wagering gaming terminals. Because the outcomes of these gaming terminals are completely randomly determined, there is no certainty that a player will ever obtain any particular award. That is, no matter how many times a player plays the game, since the gaming terminal generates outcomes randomly or completely based upon a probability calculation, there is no certainty that the game will ever provide the player with a rare outcome, such as a jackpot award, or any other specific value for that matter. On the other hand, due to the random determination, the gaming terminal can provide the rare outcomes, such as jackpot awards, numerous times in a small number of plays. For example, a probability-based $1 slot machine gaming terminal may be programmed to payback 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based slot machine gaming terminal, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming terminals in-part for these reasons. These regulatory bodies permit the use of wagering gaming terminals which are guaranteed to provide certain or definite awards, so that, for example, a certain number of wins is guaranteed and the overall amount paid back to players is guaranteed. That is, the payback percentage is fixed and not an average expected amount. One type of gaming terminal which complies with this requirement is an instant-type lottery gaming terminal. An instant-type lottery gaming terminal includes a finite pool or set of electronic tickets with each electronic ticket assigned to a predetermined outcome. Alternatively, each electronic ticket could be assigned to a random number or game play seed. Each seed is deterministic of a predetermined outcome. That is, the gaming terminal utilizes the random number or game play seed in a random number generating algorithm to generate random numbers that the gaming terminal then uses to determine and provide the predetermined outcome. In an instant-type lottery gaming terminal, as the predetermined outcome for each electronic ticket is revealed to a player on the gaming terminal, the ticket is removed (i.e., flagged as used) from the finite pool or set of electronic tickets. Once removed from the pool or set, a ticket cannot be used again to determine another game outcome. This type of gaming terminal provides players with all of the available outcomes over the course of the play cycle and guarantees the actual wins and losses.

Since an instant-type lottery gaming machine has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

Even though a pool may contain more than one of the same game outcome (i.e., the loss or the win and if a win, the value), the presentation to the player (such as reel stops in the case of slot machines or simulated slot machines, cards dealt or drawn in the case of simulated card games and the like) is preferably varied for each sequential game outcome. For example, in the twenty ticket pool described above, while three game outcomes may each determine a win game outcome with a value of $1, in a slot machine type game each game outcome will be preferably presented to the player as multiple different or all different winning combinations of reel symbols.

Central determination gaming systems are also generally known. A central determination gaming system provides a plurality of individual gaming terminals, located in a gaming establishment, such as a casino, coupled by one or more communication links, to a central processor or controller. When a player plays a game on one of the gaming terminals, a game outcome is randomly generated based on probability data by the central controller. The generated game outcome and how the game outcome is to be presented or displayed to the player are communicated from the central controller to the individual gaming terminal and then provided to the player. It should be appreciated that one central processor may continuously run hundreds or thousands of individual gaming terminals at once. Additionally, each individual gaming terminal may include a plurality of different types of games played at a plurality of different denominations.

In order to comply with the above mentioned regulatory rules that do not permit the use of probability-based gaming terminals, central determination gaming systems have been implemented wherein the central system maintains one or more predetermined pools or sets of game outcomes. Each game outcome in each set or pool includes a game outcome component (i.e., a win, a lose, a secondary game trigger or other suitable outcome) with an associated value or payout amount, if any, and a game presentation component (i.e., how the game outcome is displayed or presented to the player). In these systems, when a player makes a wager on one of the gaming devices, the central system independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming terminal. The individual gaming terminal displays or presents the game presentation component and provides the player the game outcome component with the associated value, if any, for the selected game outcome. Additionally, certain central determination gaming systems have also been implemented wherein the central system maintains one or more predetermined pools or sets of random number or game outcome seeds.

There are a number of advantages to providing for centralized production of game outcomes at individual gaming terminals. Central production or control can assist a casino or other entity in maintaining appropriate records, controlling gaming, reducing and preventing cheating or electronic or other errors, reducing or eliminating win-loss volatility and the like.

Gaming devices having a primary or base game and a secondary or a bonus game are also well known. A secondary or bonus game may be any type of suitable game, either similar to or completely different from the primary game, which is entered upon the occurrence of a triggering event or a selected outcome in the primary game. The secondary or bonus game enables the player to obtain a prize or payout in addition to the prize or payout, if any, obtained from the primary game. A secondary or bonus game produces a significantly higher level of player excitement than the primary game because it provides a greater expectation of winning than the primary game and is accompanied with more attractive or unusual features than the primary game.

SUMMARY OF THE INVENTION

The present invention relates to a central determination gaming system with a gaming terminal assisting the central controller in the generation of a game outcome. In one embodiment of the present invention, upon a player initiating a game play at one of a plurality of gaming terminals in communication with a central controller, the processor of the gaming terminal generates a random number. The random number is generated using a random number generating algorithm or other suitable methods for generating a random number. The gaming terminal then communicates a game outcome request that includes the generated random number to the central controller.

The central controller receives the game outcome request and uses the generated random number to select a game outcome from a set or pool of predetermined game outcomes. In the preferred embodiment, the central controller indexes each available game outcome in the set or pool of game outcomes and selects the available game outcome that corresponds to or is associated with the generated random number.

One embodiment illustrating the central controller indexing each available game outcome includes the central controller assigning all available game outcomes an index value starting at zero and counting up to the number of available outcomes. In this embodiment, the central controller selects the game outcome associated with that index value. For example, if the generated random number is 1250, the central controller will select the game outcome indexed as the $1250^{th}$ game outcome in the set or pool of game outcomes. It should be appreciated that if the generated random number is not associated with one of the game outcomes in the set or pool (i.e., the generated random number is greater than then the number of available game outcomes), the central controller will modulate the generated random number in order to insure that the generated random number corresponds to one of the game outcomes in the set or pool.

It should be appreciated that other suitable methods for selecting a game outcome from the set of game outcomes based on at least one gaming terminal generated random number may be employed in the present invention.

The central controller marks or flags the selected game outcome in the pool as used or unavailable. Once a game outcome is marked or flagged it is prevented from a subsequent selection from the pool upon another game play. The central controller communicates the selected game outcome to the requesting gaming terminal.

In one embodiment, after communicating the selected game outcome to the requesting gaming terminal, the central controller re-indexes the set or pool of game outcomes. For example, the central controller reassigns all available game outcomes an index value starting at zero and counting up to the number of available outcomes. In another example, the central controller reassigns the last game outcome in the index to the position in the index of the communicated game outcome. It should be appreciated that other suitable methods for reindexing the set or pool of game outcomes may be employed in the present invention.

Upon receiving the selected game outcome from the central controller, the gaming terminal acknowledges receipt of the selected game outcome. The gaming terminal then provides the player the selected game outcome.

In an alternative embodiment, upon a player initiating a game play at a gaming terminal, the gaming terminal randomly generates a random number and communicates a game outcome request (including the generated random number) to the central controller as described above.

The central controller receives the game outcome request and uses the generated random number to determine if the set or pool of predetermined game outcomes includes at least one available game outcome based on the generated random number. For example, as described above, the central controller indexes each available game outcome in the set or pool of game outcomes and determines if the set or pool of game outcomes includes an available game outcome that corresponds to or is associated with the generated random number.

If the set or pool of game outcomes includes at least one available game outcome based on the generated random number, the central controller selects an available game outcome based on the generated random number from the set or pool of game outcomes. If the set or pool of game outcomes does not include at least one available game outcome based on the generated random number, the central controller discards the generated random number and instructs the gaming terminal to generate and provide the central controller at least one additional random number. The central controller then determines, as described above, if the set or pool of game outcomes includes at least one available game outcome based on these additional random numbers. This process continues until the central controller selects an available outcome from the set or pool of game outcomes that is based on the gaming terminal generated random number.

As described above, the central controller marks or flags the selected game outcome in the pool as used or unavailable and communicates the selected game outcome to the requesting gaming terminal. Upon receiving the selected game outcome from the central controller, the gaming terminal acknowledges receipt of the selected game outcome. The gaming terminal then provides the player the selected game outcome.

In an alternative embodiment, upon receiving at least one and preferably a plurality of random numbers generated from the gaming terminal, the central controller uses the generated random numbers in a program code or algorithm for the specific game played to determine a game outcome. That is, similar to how a probability based gaming terminal generates a game outcome based on random numbers, the central controller determines a game outcome based on the gaming terminal generated random numbers. The central controller then determines if the set or pool of game outcomes includes at least one available game outcome based on the determined game outcome. If the set or pool of game outcomes includes at least one available game outcome based on the determined game outcome, the central controller flags an available game outcome in the set or pool that is based on the determined game outcome. The central controller then sends a confirmation to the gaming terminal to generate a game outcome based on the gaming terminal generated random numbers. It should be appreciated that in this embodiment, the gaming terminal retains the generated random number(s) in a memory or other storage device while awaiting a confirmation from the central controller. In an alternative embodiment, after the central controller flags a game outcome, the central controller directly communicates the generated random numbers back to the gaming terminal.

If the set or pool of game outcomes does not include at least one available game outcome based on the determined game outcome, the central controller discards the generated random number and the determined game outcome. The central controller then communicates an instruction to the gaming terminal to generate at least one additional random number that is communicated to the central controller. In the alternative embodiment wherein the gaming terminal retains the generated random number(s) in a memory device, the communicated instruction also instructs the gaming terminal to discard the retained random number(s). The central controller determines another game outcome based on the additionally generated random number(s) and determines if the set or pool of game outcomes includes at least one available game outcome based on this determined game outcome. This process of discarding unavailable game outcomes continues until the set or pool of game outcomes includes an available game outcome that is based on a determined game outcome. In this case, the available game outcome is flagged and a confirmation is communicated to the gaming terminal as described above.

Upon receiving the confirmation (or the generated random number) sent from the central controller, the gaming terminal proceeds with utilizing the generated random number(s) in the program code or algorithm for the specific game played to determine the game outcome. It should be appreciated that the program code or algorithm utilized by the gaming terminal is the same program code or algorithm that the central processor utilizes to determine a game outcome based on the gaming terminal generated random numbers. That is, since the same random numbers ran through the same program code or algorithm will produce the same game outcome, the gaming terminal determined game outcome will be the same game outcome as the available game outcome flagged by the central controller. The gaming terminal then provides the determined game outcome to the player.

It should be appreciated that the present invention can be employed with the central controller maintaining at least one set or pool of game outcome seeds. Each seed is deterministic of a predetermined outcome. In this embodiment, as described above, the gaming terminal generates at least one random number and communicates the generated random number to the central controller. The central controller then selects an available game outcome seed from the set or pool of game outcome seeds based on the generated random number. The central controller flags the selected game outcome seed as unavailable and communicates the selected game outcome seed to the gaming terminal.

After acknowledging receipt of the selected game outcome seed, the gaming terminal utilizes the selected game outcome seed in a random number generating algorithm to generate at least one and preferably a plurality of random numbers. The gaming terminal uses the generated random numbers to determine and provide to the player a game outcome for the selected game outcome seed.

The present invention provides a number of advantages over existing central determination gaming systems. For example, since each gaming terminal is generating random numbers and communicating the generated random numbers to the central controller, the present invention provides a central determination gaming system that is not dependent on a single random number generator at the central controller. This configuration reduces the security risk associated with a single random number generator at a central site determining the game outcomes for each gaming terminal in the network.

Another advantage of the present invention is that existing probability based gaming terminals with modified program codes and communication modules may be implemented with the present invention. That is, existing probability based gaming terminals may be used to generate random numbers and instead of the generated random numbers used to determine the game outcome to be provided to the player (as occurs in existing probability based gaming terminals), the gaming terminal of the present invention includes an additional game state, as described above, wherein the generated random numbers are communicated to the central controller to assist the central controller in the selection of a game outcome.

An additional advantage of the present invention is the outcomes provided are non-deterministic and unpredictable, since they depend not only on the random number generated by the gaming terminal, but also on how the set or pool of game outcomes is currently indexed.

Additionally, even though the central controller maintains a pool of predetermined game outcomes (which guarantees a specific amount of actual wins and losses), since the gaming terminals are generating random numbers (that are used by the central controller to select the game outcome) as in a probability based gaming terminal, over the course of the play cycle, the game outcomes provided from the central determination gaming system will mirror a network of probability based gaming terminals in a non-central determination gaming system. That is, the present invention provides the advantage of a network of contemporary gaming terminals that determine random numbers (that are used by the central controller to determine game outcomes) while also complying with certain jurisdictional regulations that require gaming terminals which are guaranteed to provide certain or definite awards. This increases the player's level of excitement and enjoyment because the network of gaming terminals in the central determination gaming system retains the look and feel of contemporary probability based gaming terminals.

Additional features and advantages of the present invention are described in, and will be apparent from, the following Detailed Description of the Invention and the figures.

DETAILED DESCRIPTION OF THE INVENTION

Figure 1:
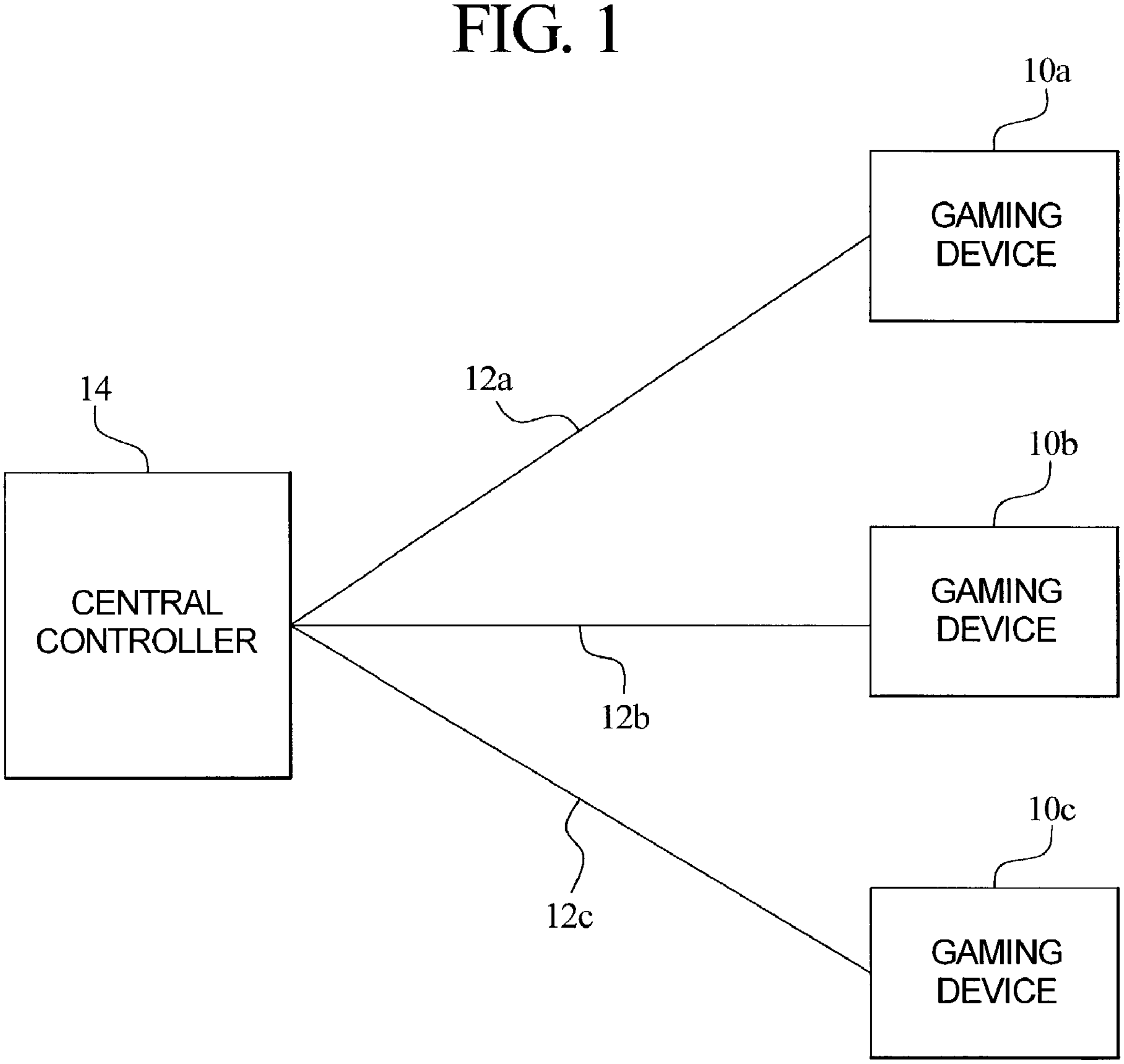
FIG. 1 is a schematic block diagram illustrating a plurality of gaming terminals in communication with a central controller.

Referring now to the drawings, as illustrated in FIG. 1, one embodiment of the present invention includes a plurality of gaming devices or gaming terminals 10*a*, 10*b* and 10*c* located in a gaming establishment, such as a casino, coupled by one or more communication links 12*a*, 12*b* and 12*c* to a central computing system or central controller 14. The communication links 12 can be any of a plurality of devices known to those of skill in the art for receiving data transmissions to and from the gaming terminal. The central processor maintains supervision over the entire network of gaming terminals.

In one embodiment, the central controller maintains at least one predetermined set or pool of predetermined game outcomes for each type of game provided on the gaming terminals. It should be appreciated that each set or pool of game outcomes may include a plurality of the same game outcome. In an alternative embodiment, the central controller maintains a plurality of predetermined sets or pools of predetermined game outcomes for each type of provided game. In another embodiment, the central controller maintains a predetermined set or pool of predetermined game outcomes for each denomination of each type of game provided on the gaming terminals. In another embodiment, the central controller maintains at least one predetermined set or pool of predetermined game outcome seeds. As described below, each game outcome seed is deterministic of a predetermined game outcome. Other methods for storing the pool or set of predetermined game outcomes may be employed in accordance with the present invention.

Each predetermined game outcome includes an outcome component (i.e., a win, a lose, a secondary game triggering or other suitable outcome), with an associated value or pay amount, if any. Each game outcome also includes a game presentation component. A game presentation component is how the predetermined game outcome is presented or displayed to the player, such as a reel symbol combination of a slot machine or a hand of cards dealt in a card game. In order to increase player entertainment, a plurality of game outcomes with the same outcome component and associated value have different presentation components. That is, the same win $5 game outcome is presented or displayed to the player in a different way. For example, in a slot machine style gaming device, each of the same game outcomes are displayed or presented to the player as a different reel symbol combination.

In one embodiment, all of the gaming terminals which are coupled to the central processor are configured to play the same type of game. In an alternative embodiment, a plurality of the gaming terminals are configured so that different gaming terminals may be used to play different types of games. That is, some gaming terminals may be used for playing a slot machine style game, others may be used for playing a poker style game, others may be used for playing a blackjack style game, and the like. In another embodiment, a plurality of gaming terminals may each be configured for playing a plurality of different games.

Figure 2A:
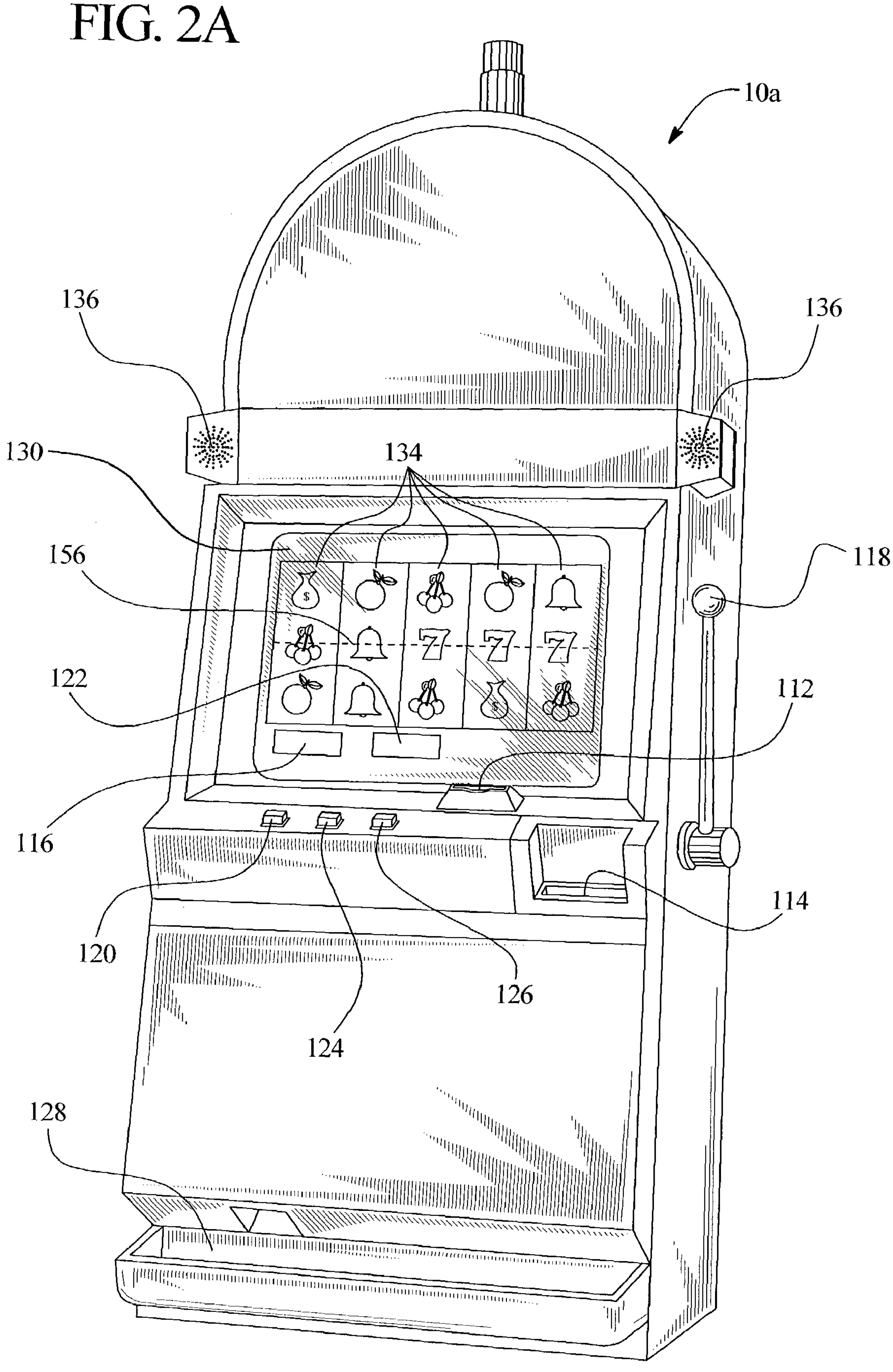
FIGS. 2A and 2B are perspective views of alternative embodiments of the gaming terminal of the present invention.
Figure 2B:
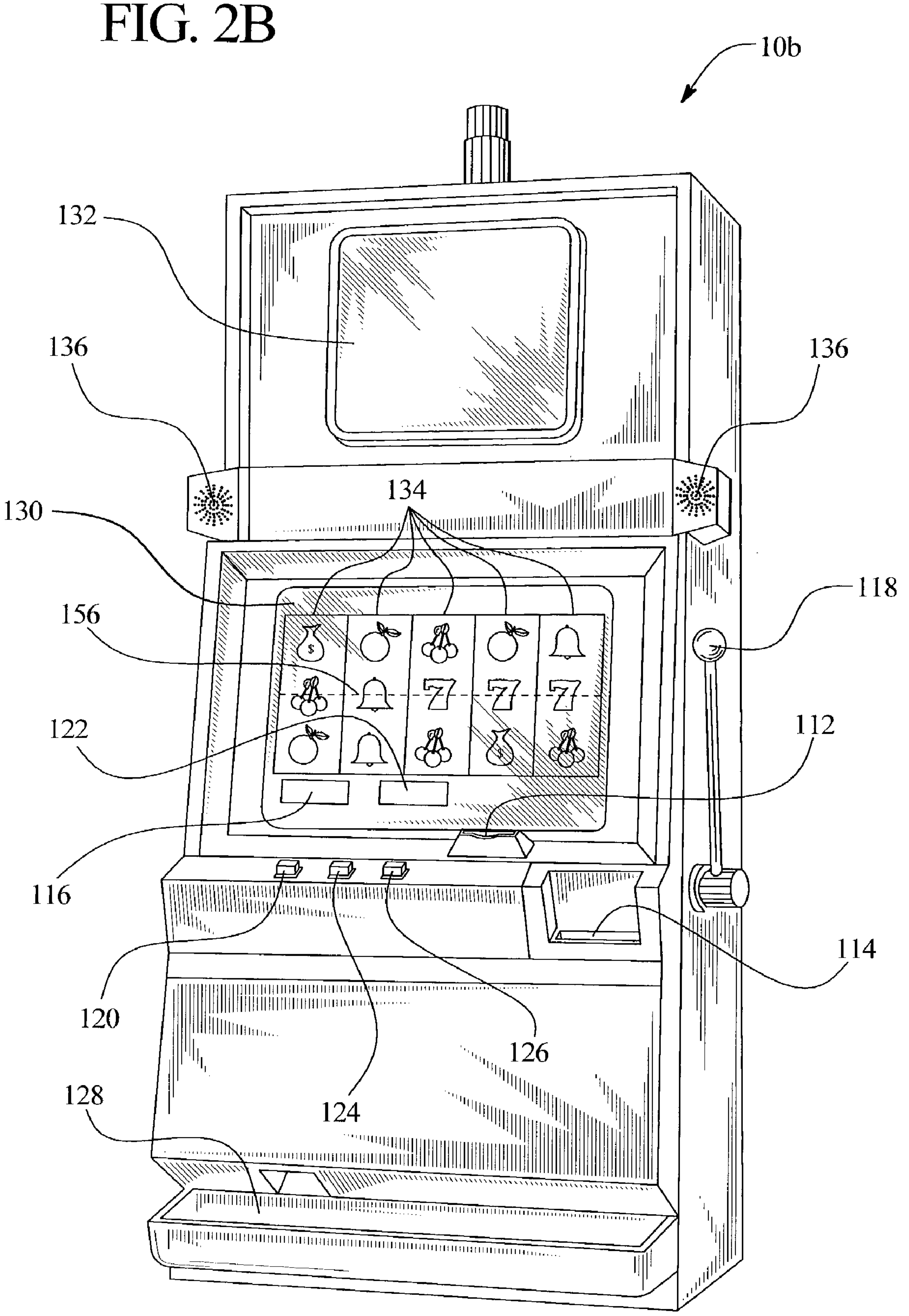

Two embodiments of the gaming terminal or gaming device of the present invention are shown in FIGS. 2A and 2B as gaming terminal 10*a* and gaming terminal 10*b*, respectively. Gaming terminal 10*a* and/or gaming terminal 10*b* are generally referred to herein as gaming terminal 10. Gaming terminal 10 is in one embodiment a slot machine having the controls, displays and features of a conventional slot machine. It is constructed so that a player can operate it while standing or sitting, and gaming terminal 10 is preferably mounted on a console. However, it should be appreciated that gaming terminal 10 can be constructed as a pub-style table-top game (not shown) which a player can operate preferably while sitting. Furthermore, gaming terminal 10 can be constructed with varying cabinet and display designs, as illustrated by the designs shown in FIGS. 2A and 2B.

As illustrated in FIGS. 2A and 2B, gaming terminal 10 includes a coin slot 112 and bill acceptor 114 where the player inserts money, coins or tokens. The player can place coins in the coin slot 112 or paper money in the bill acceptor 114. Other devices could be used for accepting payment such as readers or validators for credit cards or debit cards. When a player inserts money in gaming terminal 10, a number of credits corresponding to the amount deposited is shown in a credit display 116. After depositing the appropriate amount of money, a player can begin the game by pulling arm 118 or pushing play button 120. Play button 120 can be any play activator used by the player which starts any game or sequence of events in the gaming terminal.

As shown in FIGS. 2A and 2B, gaming terminal 10 also includes a bet display 122 and a bet one button 124. The player places a bet by pushing the bet one button 124. The player can increase the bet by one credit each time the player pushes the bet one button 124. When the player pushes the bet one button 124, the number of credits shown in the credit display 116 decreases by one, and the number of credits shown in the bet display 122 increases by one.

A player may "cash out" and thereby receive a number of coins corresponding to the number of remaining credits by pushing a cash out button 126. When the player "cashes out," the player receives the coins in a coin payout tray 128. The gaming terminal 10 may employ other payout mechanisms such as credit slips redeemable by a cashier or electronically recordable cards which keep track of the player's credits.

Gaming terminal 10 also includes one or more display devices. The embodiment shown in FIG. 2A includes a central display device 130, and the alternative embodiment shown in FIG. 2B includes a central display device 130 as well as an upper display device 132. Gaming terminal 10 displays a plurality of reels 134, such as three to five reels 134 in mechanical or video form at one or more of the display devices. A display device can be any viewing surface such as glass, a video monitor or screen, a liquid crystal display or any other display mechanism. If the reels 134 are in video form, the display device for the video reels 134 is preferably a video monitor. It should be appreciated that the present invention can include one or more paylines displayed in a horizontal and/or diagonal fashion.

Each reel 134 displays a plurality of indicia such as bells, hearts, fruits, numbers, letters, bars or other images which preferably correspond to a theme associated with the gaming terminal 10. The symbols and indicia used on and in gaming terminal 10 may be in mechanical, electronic, electrical or video form. Furthermore, gaming terminal 10 preferably includes speakers 136 for making sounds or playing music.

Figure 3:
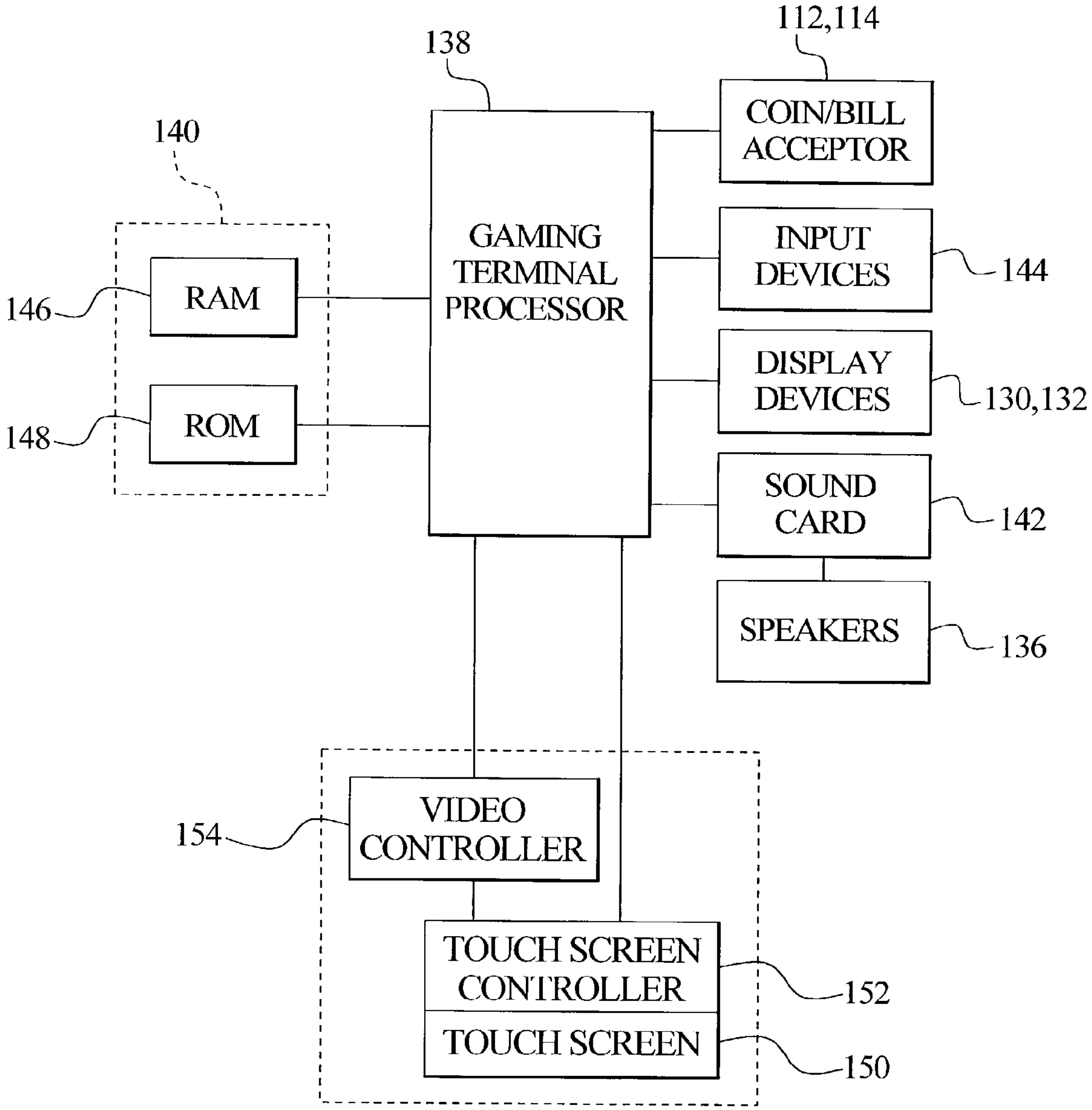
FIG. 3 is a schematic block diagram of an electronic configuration of one embodiment of the gaming terminal of the present invention.

As illustrated in FIG. 3, the general electronic configuration of gaming terminal 10 preferably includes: a processor 138; a memory device 140 for storing program code or other data; a central display device 130; an upper display device 132; a sound card 142; a plurality of speakers 136; and one or more input devices 144. The processor 138 is preferably a microprocessor or microcontroller-based platform which is capable of displaying images, symbols and other indicia such as images of people, characters, places, things and faces of cards. The memory device 140 can include random access memory (RAM) 146 for storing event data or other data generated or used during a particular game. The memory device 140 can also include read only memory (ROM) 148 for storing program code which controls the gaming terminal 10 so that it plays a particular game in accordance with applicable game rules and pay tables.

As illustrated in FIG. 3, the player preferably uses the input devices 144, such as pull arm 118, play button 120, the bet one button 124 and the cash out button 126 to input signals into gaming terminal 10. In certain instances it is preferable to use a touch screen 150 and an associated touch screen controller 152 instead of a conventional video monitor display device. Touch screen 150 and touch screen controller 152 are connected to a video controller 154 and processor 138. A player can make decisions and input signals into the gaming terminal 10 by touching touch screen 150 at the appropriate places. As further illustrated in FIG. 3, the processor 138 can be connected to coin slot 112 or bill acceptor 114. The processor 138 can be programmed to require a player to deposit a certain amount of money in order to start the game.

It should be appreciated that although a processor 138 and memory device 140 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 138 and memory device 140 preferably reside on each gaming terminal 10 unit, it is possible to provide some or all of their functions at a central location such as a network server for communication to a playing station such as over a local area network (LAN), wide area network (WAN), Internet connection, microwave link, and the like.

In addition to winning base game credits, the gaming terminal 10, including any of the base games disclosed above, also includes secondary or bonus games that give players the opportunity to win credits. The gaming terminal 10 preferably employs a video-based display device 130 or 132 for the secondary or bonus games. The secondary or bonus games include a program that automatically begins when the player achieves a qualifying condition or a secondary game triggering outcome in the base game.

In the slot machine embodiment, the qualifying condition or a secondary game triggering outcome includes a particular symbol or symbol combination generated on a display device. As illustrated in the five reel slot game shown in FIGS. 1A and 1B, the qualifying condition or secondary game triggering outcome includes the number seven appearing on three adjacent reels 134 along a payline 156. It should be appreciated that the present invention includes one or more paylines, such as payline 156, wherein the paylines can be horizontal, diagonal or any combination thereof.

Figure 4:
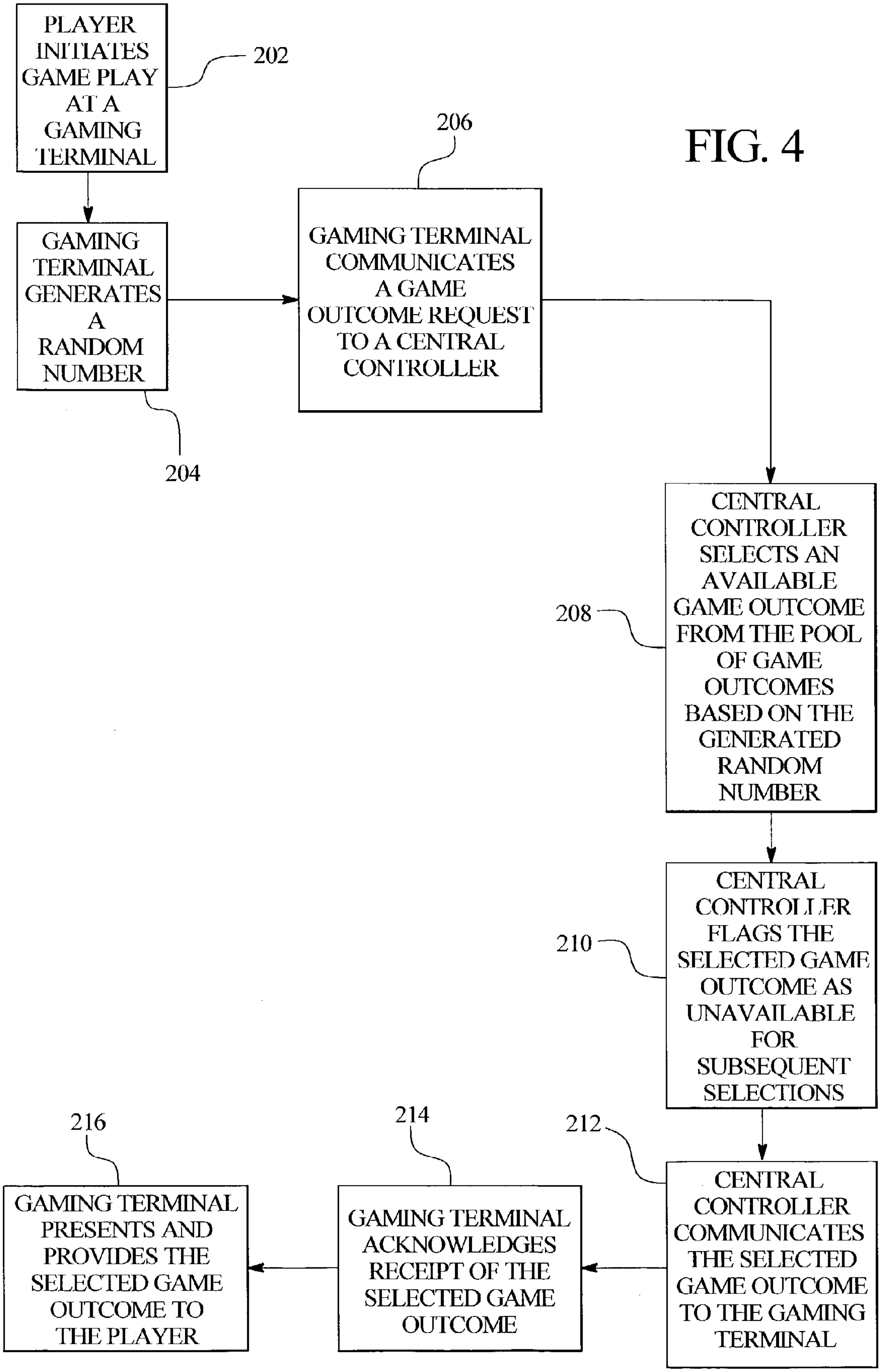
FIG. 4 is a schematic block diagram illustrating one embodiment of the present invention wherein the gaming terminal generates a random number that assists the central controller in selecting a game outcome to be provided to the player.

With reference to FIG. 4, a player initiates game play at one of the plurality of gaming terminals in communication with the central controller as indicated in block 202. In one embodiment of the present invention illustrating a slot machine style gaming terminal, to initiate operation of a primary or base game of the gaming terminal the player must insert the appropriate amount of money or tokens and then pull the arm or push the play button. The reels will then begin to spin. As the wheels are spinning, the gaming terminal generates a random number as indicated in block 204. In an alternative embodiment, the gaming terminal generates a random number upon the player placing a wager in the gaming terminal. In an alternative embodiment, the gaming terminal generates a plurality of random numbers. The gaming terminal may generate the random number using a random number generating algorithm or other suitable methods for generating one or more random numbers. In another embodiment, the gaming terminal randomly generates other data or information to assist the central controller in selection of an appropriate game outcome.

Having generated the random number, the gaming terminal communicates a game outcome request to the central controller as indicated in block 206. The communicated game outcome request includes the generated random number. In an alternative embodiment, the gaming terminal communicates the generated random number directly to the central controller. The central controller receives the game outcome request and uses the generated random number to select a game outcome from a set of pool of predetermined game outcomes as indicated in block 208.

In the preferred embodiment, the central controller indexes each available game outcome in the set or pool of game outcomes and selects the available game outcome that corresponds to or is associated with the generated random number. One embodiment illustrating the central controller indexing each available game outcome includes the central controller assigning all available game outcomes an index value starting at zero counting up to the number of available outcomes. For example, if the set or pool of game outcomes includes ten-thousand game outcomes, each game outcome will be assigned an index value (or number) one through nine-thousand-nine-hundred and ninety-nine. The central controller then selects the game outcome assigned with that index value. For example, if the generated random number is three-thousand and five, the central controller selects the game outcome assigned the index value (or number) of three-thousand and five. In this embodiment, if the generated random number is not associated with one of the game outcomes in the set or pool of game outcomes (i.e., the generated random number is greater than the number of available game outcomes), the central controller performs a modulation operation to the generated random number to convert the generated random number to an index value (or number) within the range of index values (or numbers) assigned to the game outcomes. It should be appreciated that by converting or modulating the generated random number to an index value (or number) within the range of index values (or numbers) assigned to the game outcomes, the central controller insures that the generated random number corresponds to one of the game outcomes in the set or pool and that, in this embodiment, the gaming terminal only needs to generate and communicate one random number to the central controller, therefore reducing the amount of communication between the gaming terminal and the central controller.

In another embodiment, the central controller maintains a table of each type of available game outcome and the number of each type of available game outcome. In this embodiment, the central controller selects an available game outcome from the table based on the generated random number. For example, the central controller maintained table may indicate that the first twelve-hundred available game outcomes are lose game outcomes, the next five-hundred available game outcomes are win $1 game outcomes and the next one-hundred available game outcomes are win $2 game outcomes. In this example, if the generated random number is thirteen-hundred-twenty-five, then the central controller will select a win $1 game outcome. That is, since thirteen-hundred-twenty-five is greater than twelve-hundred (the number of available lose game outcomes) but is less than or equal to seventeen-hundred (the number of available lose game outcomes and win $1 game outcomes), the central controller determines that the generated random number of thirteen-hundred-twenty-five corresponds to a win $1 game outcome. It should be appreciated that other suitable methods for selecting a game outcome from the set of game outcomes based on the gaming terminal generated random number may be employed in the present invention.

The central controller marks or flags the selected game outcome in the pool as used or unavailable as indicated in block 210. Once a game outcome is marked or flagged it is prevented from a subsequent selection from the pool upon another game play. It should be appreciated that if the pool or set includes more than one of the same game outcome, then only the flagged game outcome cannot be selected upon a subsequent game outcome selection. For example, if a pool or set includes thirty win $5 game outcomes and one is selected and flagged, the flagged win $5 game outcome cannot be selected again but the other twenty-nine non-selected win $5 game outcomes remain available for subsequent game outcome selections. The central controller then communicates the selected game outcome to the requesting gaming terminal as indicated in block 212.

In one embodiment, after communicating the selected game outcome to the requesting gaming terminal, the central controller re-indexes the set or pool of game outcomes. For example, the central controller reassigns all available game outcomes an index value starting at zero and counting up to the new number of available outcomes minus one. In another example, the central controller reassigns the last game outcome in the index to the position in the index of the flagged game outcome.

In the embodiment wherein the central controller maintains a table of the number of available game outcomes for each type of game outcome, after the central controller flags the selected game outcome, the central controller reduces the number of available game outcomes for the flagged type of game outcome by one. For example, if the table previously had five-hundred available win $1 game outcomes and, as described above, one of the available win $1 game outcomes was selected and flagged, then the table would be updated to reflect four-hundred-ninety-nine available win $1 game outcomes. It should be appreciated that other suitable methods for reindexing/updating the set or pool of game outcomes may be employed in the present invention.

Upon receiving the selected game outcome from the central controller, the gaming terminal acknowledges receipt of the selected game outcome as indicated in block 214. The gaming terminal displays or presents the game presentation component of the selected game outcome and provides the game outcome component of the selected game outcome with the associated value, if any, to the player as indicated in block 216. If the provided game outcome is a win game outcome or a lose game outcome, the game ends.

If the provided game outcome is a bonus or secondary game triggering outcome, the game proceeds to enable the player to play at least one bonus or secondary game. It should be appreciated that regardless of how the game outcome is ultimately presented to the player, either as a value or payout from the primary or base game, as a value or payout from the secondary or bonus game, as a lose from the primary or base game or as a lose from the secondary or bonus game, the game outcome is predetermined. For example, if a particular game outcome in a $1 slot machine gaming device is a win outcome with an associated value or payout of $10, the outcome may be presented to the player as a $10 win outcome in the primary or base game, a $10 secondary or bonus game win outcome or any combination of payouts in the primary or base game and secondary or bonus game that result in a total payout of $10. Either way, the player is provided $10 and that particular game outcome is removed from the set of game outcomes. In one embodiment, if the provided game outcome is a bonus or secondary game triggering outcome, the bonus or secondary game proceeds as described above. That is, in the bonus or secondary game, the gaming terminal randomly generates at least one random number and the central controller selects, as described above, an available secondary or bonus game outcome from a set or pool of bonus game outcomes based on the gaming terminal generated random number. It should be appreciated that the bonus game may proceed in any other suitable method.

Figure 5:
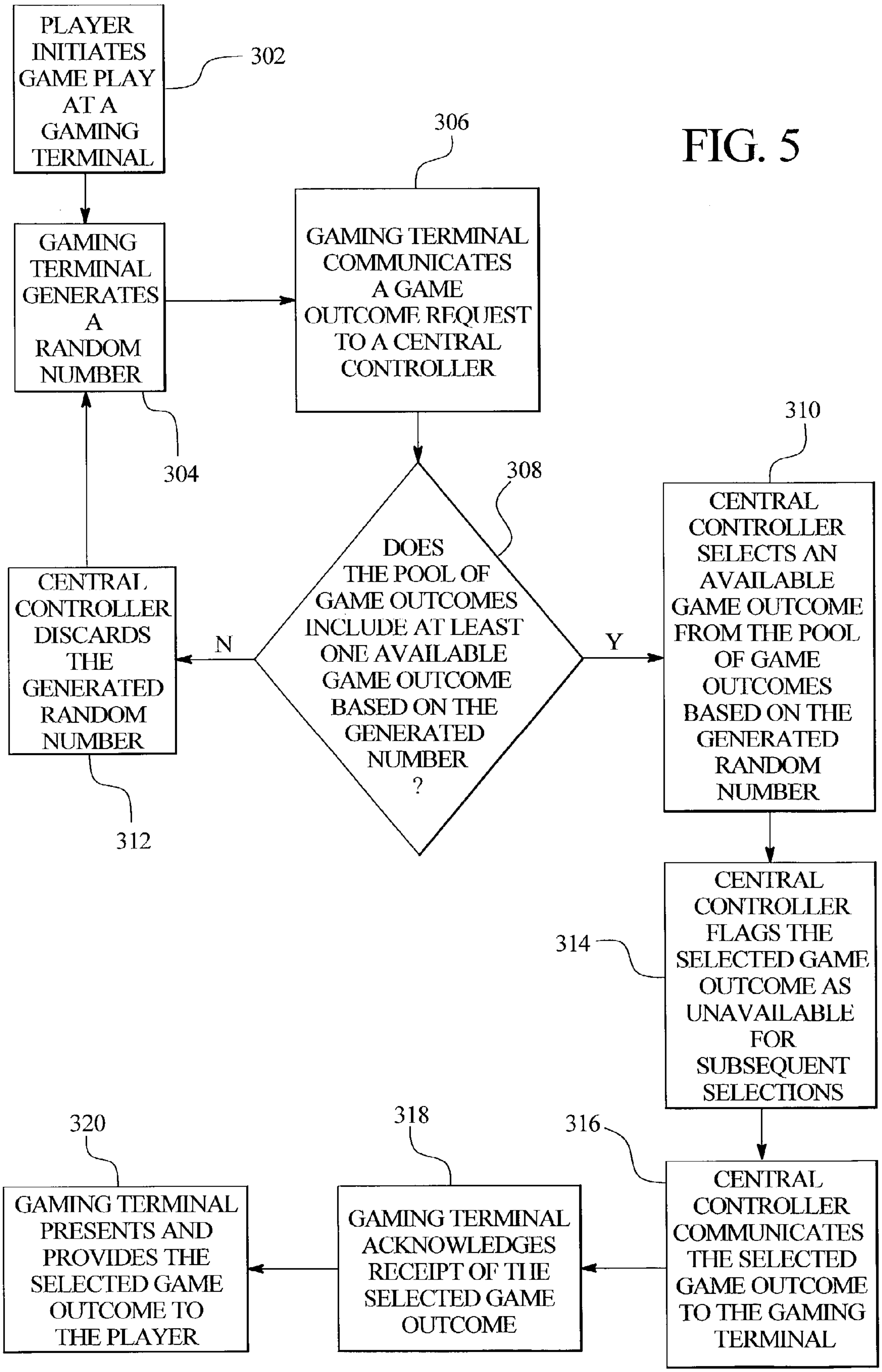
FIG. 5 is a schematic block diagram illustrating an alternative embodiment of the present invention wherein the gaming terminal generates a random number that assists the central controller in selecting a game outcome to be provided to the player.

With reference to FIG. 5, in an alternative embodiment, upon player initiation of game play at one of the plurality of gaming terminals in communication with the central controller, the gaming terminal generates a random number as indicated in blocks 302 and 304, respectfully. The gaming terminal then communicates a game outcome request (including the generated random number) to the central controller as indicated in block 306. In an alternative embodiment, the gaming terminal communicates the generated random number directly to the central controller. The central controller receives the game outcome request and uses the generated random number to determine if a set or pool of predetermined game outcomes includes at least one available game outcome based on the gaming terminal generated random number as indicated in diamond 308. In one embodiment, the central controller indexes each available game outcome in the set or pool of game outcomes, as described above, and determines if the set or pool of game outcomes includes an available game outcome that corresponds to or is associated with the generated random number as described above.

If the set or pool of game outcomes includes at least one available game outcome based on the generated random number, the central controller selects an available game outcome based on the generated random number from the set or pool of game outcomes as indicated in block 310.

If the set or pool of game outcomes does not include at least one available game outcome, the central controller discards the generated random number as indicated in block 312 and instructs the gaming terminal to generate and provide the central controller at least one additional random number as indicated in blocks 304 and 306. The central controller then determines, as described above and indicated in diamond 308, if the set or pool of game outcomes includes at least one available game outcome based on this random number. This process continues until the central controller selects an available game outcome from the set or pool of game outcomes that is based on a gaming terminal generated random number. It should be appreciated that other suitable methods for determining and selecting a game outcome from the set of game outcomes based on at least one gaming terminal generated random number may be employed in the present invention.

As described above, the central controller marks or flags the selected game outcome in the pool as used or unavailable as indicated in block 314. The central controller then communicates the selected game outcome to the requesting gaming terminal as indicated in block 316.

Upon receiving the selected game outcome from the central controller, the gaming terminal acknowledges receipt of the selected game outcome as indicated in block 318. The gaming terminal displays or presents the game presentation component of the selected game outcome and provides the game outcome component of the selected game outcome with the associated value, if any, to the player as indicated in block 320. If the provided game outcome is a win game outcome or a lose game outcome, the game ends. If the provided game outcome is a bonus game triggering outcome, the gaming terminal enables the player to play at least one bonus game as described above.

In an alternative embodiment of the present invention (not shown), the central controller maintains at least one set or pool of game outcome seeds. Each game outcome seed is a unique random number seed which is deterministic of a game outcome, such as a win outcome, a lose outcome or a secondary or bonus game triggering outcome. In this embodiment, the gaming terminal generates at least one random number and communicates the generated random number to the central controller. In one embodiment, as described above, the central controller then selects an available game outcome seed based on the generated random number. In an alternative embodiment, as also described above, the central controller determines if the set or pool of game outcome seeds includes at least one available game outcome seed that is based on the generated random number. If the set or pool includes at least one available game outcome seed based on the generated random number, the gaming terminal selects an available game outcome seed from the set or pool of game outcome seeds based on the generated random number. If the set or pool does not include at least one available game outcome seed based on the generated random number, the central controller continues discarding random numbers and requesting additional random numbers as described above until the set or pool of game outcome seeds includes an available game outcome that is based on the gaming terminal generated random number. The central controller flags the selected game outcome seed as unavailable and communicates the selected game outcome seed to the gaming terminal.

After acknowledging receipt of the selected game outcome seed, the gaming terminal utilizes the selected game outcome seed in a random number generating algorithm to generate at least one and preferably a plurality of random numbers. The gaming terminal uses the generated random numbers to determine the game outcome that will ultimately be provided to the player.

In one embodiment, the processor of the gaming terminal generates at least one and preferably a plurality of random numbers based on the selected game outcome seed and uses the generated random numbers to determine a game presentation component. For example, in a 3-reel slot machine style game, the processor may generate three random numbers. The first random number is used by the processor of the gaming terminal to determine the stop position of the first reel. The second random number is used by the processor to determine the stop position of the second reel. The third random number is used by the processor to determine the stop position of the third reel. The processor then compares the stopped reel combination to a pay table or other stored data to determine the outcome component and the associated value, if any. In another embodiment, at least one generated random number is associated with a game outcome component with an associated value (i.e., a win $5 outcome) and at least one random number is associated with a game presentation component (i.e., a specific reel symbol combination). In this embodiment, the gaming terminal determines the game outcome component and game presentation component associated with the generated random numbers. It should be appreciated that other suitable methods of determining the game outcome based on a selected game outcome seed may be employed in the present invention.

It should be appreciated that if any one or more than one designated gaming terminals configured for playing a certain game receive the same specific game outcome seed, the resulting random numbers generated (and thus the resulting game outcomes) will always be the same even though the different gaming terminals operate independently from one another. That is, if a plurality of the same gaming terminals each run the same game outcome seed through a predefined random number generating algorithm, each of such same gaming terminals will generate the same series of random numbers that correspond to the same game outcomes.

In an alternative embodiment (not shown), the central controller uses the generated random number in the program code or algorithm for the specific game played to determine a game outcome. In one embodiment, the central controller determines if the set or pool of game outcomes includes at least one available of the determined game outcome. In another embodiment, the central controller determines if the set or pool of game outcomes includes at least one available game outcome based on the determined game outcome. If the set or pool of game outcomes includes at least one available determined game outcome (or game outcome based on the determined game outcome), the central controller flags the available determined game outcome in the set or pool. The central controller then sends a confirmation to the gaming terminal to generate a game outcome based on the gaming terminal generated random number. It should be appreciated that in this embodiment, the gaming terminal retains the generated random number in a memory or other storage device while awaiting a confirmation from the central controller. In an alternative embodiment, after the central controller flags a game outcome, the central controller directly communicates the generated random number back to the gaming terminal.

If the set or pool of game outcomes does not include at least one available determined game outcome (or game outcome based on the determined game outcome), the central controller discards the generated random number and the determined game outcome. The central controller then communicates an instruction the gaming terminal to generate at least one additional random number that is communicated to the central controller. In the alternative embodiment wherein the gaming terminal retains the generated random number in a memory device, the communicated instruction also instructs the gaming terminal to discard the retained random number. The central controller determines another game outcome based on the additional random number communicated from the gaming terminal and determines if the set or pool of game outcomes includes as available at least one of the determined game outcome (or at least one game outcome based on the determined game outcome). This process of discarding unavailable game outcomes continues until the set or pool of game outcomes includes an available game outcome that is based on a determined game outcome. In this case, the available determined game outcome is flagged and a confirmation (or the generated random number directly) is communicated to the gaming terminal as described above.

After receiving the confirmation (or the generated random number) from the central controller, the gaming terminal proceeds with utilizing the generated random number in the program code or algorithm for the specific game played to determine the game outcome. It should be appreciated that the program code or algorithm utilized by the gaming terminal is the same program code or algorithm that the central processor utilizes to randomly generate a game outcome. That is, since the same random numbers ran through the same program code or algorithm will produce the same game outcome, the gaming terminal determined game outcome will be the same game outcome as the available game outcome flagged by the central controller. The gaming terminal presents or displays the determined game presentation component and provides the determined outcome component and associated value, if any, to the player.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A central determination gaming system comprising:

a central controller; and a memory device which stores a plurality of instructions, which when executed by the central controller, cause the central controller to:

(a) maintain at least one game outcome set, wherein said game outcome set includes a plurality of predetermined game outcomes and at least two of said predetermined game outcomes are different, (b) receive a gaming terminal generated random number from a gaming terminal which is remote from the central controller, (c) select one of said predetermined game outcomes from said game outcome set, wherein said gaming terminal generated random number is used as an input to determine the selected predetermined game outcome, (d) prevent said selected predetermined game outcome from further selection from said game outcome set, and (e) output said selected predetermined game outcome to said gaming terminal.

2. The central determination gaming system of claim 1, wherein when executed by the central controller, the plurality of instructions cause the central controller to maintain a plurality of game outcome sets.

3. The central determination gaming system of claim 1, wherein when executed by the central controller, the plurality of instructions cause said central controller to receive a plurality of gaming terminal generated random numbers from a plurality of gaming terminals which are remote from the central controller and to select a plurality of said predetermined game outcomes from said game outcome set, wherein said gaming terminal generated random numbers are used as an input to determine the selected predetermined game outcomes.

4. The central determination gaming system of claim 1, wherein when executed by the central controller, the plurality of instructions cause said central controller to receive a game outcome request from said gaming terminal wherein said game outcome request includes said gaming terminal generated random number.

5. The central determination gaming system of claim 1, wherein when executed by the central controller, the plurality of instructions cause said central controller to maintain at least one game outcome seed set, wherein said game outcome seed set includes a plurality of predetermined game outcome seeds and each game outcome seed is deterministic of a game outcome.

6. The central determination gaming system of claim 5, wherein when executed by the central controller, the plurality of instructions cause said central controller to select one of said game outcome seeds from said game outcome seed set, wherein said gaming terminal generated random number is used as an input to determine the selected game outcome seed, to prevent said selected game outcome seed from further selection from said game outcome seed set and to output said selected game outcome seed to said gaming terminal.

7. A central determination gaming system comprising:

a central controller; and a memory device which stores a plurality of instructions, which when executed by the central controller, cause the central controller to:

(a) maintain a game outcome set, wherein said game outcome set includes a plurality of predetermined game outcomes and at least two of said predetermined game outcomes are different, (b) receive a random number from a gaming terminal which is remote from the central controller, (c) select one of said predetermined game outcomes for a primary wagering game from said game outcome set, wherein said random number is used as an input to determine the selected predetermined game outcome, (d) prevent said selected predetermined game outcome from further selection from said game outcome set and (e) communicate said selected predetermined game outcome to said gaming terminal, wherein said gaming terminal includes a display device and a processor in communication with said display device operable to enable a player to initiate said primary wagering game, to generate said random number, to communicate said random number to said central controller, to receive said selected predetermined game outcome from said central controller and to provide said predetermined game outcome to the player for said primary wagering game.

8. The central determination gaming system of claim 7, wherein when executed by the central controller, the plurality of instructions cause the central controller to maintain a plurality of game outcome sets.

9. The central determination gaming system of claim 7, wherein when executed by the central controller, the plurality of instructions cause said central controller to receive a random number from each of a plurality of gaming terminals which are remote from the central controller and to select one of said game outcomes for a primary wagering game from said game outcome set, wherein each received random number from each gaming terminal is used as an input to determine the selected game outcome.

10. A central determination gaming system comprising:

a central controller;

a memory device which stores a plurality of instructions, which when executed by the central controller, cause the central controller to:

(a) maintain a game outcome set, wherein said game outcome set includes a plurality of predetermined game outcomes and at least two of said predetermined game outcomes are different, (b) receive a random number, (c) select one of said predetermined game outcomes from said game outcome set, wherein said random number is used as an input to determine the selected predetermined game outcome, (d) prevent said selected predetermined game outcome from further selection from said game outcome set, and (e) output said selected predetermined game outcome; and at least one gaming terminal which is remote from the central controller, said at least one gaming terminal including a display device, an input device, a processor, and a gaming terminal memory device which stores a plurality of instructions, which when executed by the processor, cause the processor to operate with said display device and said input device to:

(i) enable a player to initiate a primary wagering game, (ii) generate said random number, (iii) communicate said generated random number to said central controller, (iv) receive said selected predetermined game outcome from said central controller, and (v) provide said predetermined game outcome to the player for said primary wagering game.

11. The central determination gaming system of claim 10, wherein when executed by the central controller, the plurality of instructions cause the central controller to maintain a plurality of game outcome sets.

12. The central determination gaming system of claim 10, wherein when executed by the central controller, the plurality of instructions cause said central controller to receive a random number from each of a plurality of gaming terminals that are remote from the central controller.

13. A central determination gaming system comprising:

a central controller; and a memory device which stores a plurality of instructions, which when executed by the central controller, cause the central controller to:

(a) maintain at least one game outcome set, wherein said game outcome set includes a plurality of predetermined game outcomes and at least two of said predetermined game outcomes are different, (b) receive a gaming terminal generated random number from a gaming terminal which is remote from the central controller, (c) use said random number to determine if said game outcome set includes at least one predetermined game outcome based on said random number, (d) select one of said game outcomes from said game outcome set, wherein said random number is used as an input to determine the selected predetermined game outcome, (e) prevent said selected predetermined game outcome from further selection from said game outcome set, and (f) output said selected predetermined game outcome to said gaming terminal.

14. The central determination gaming system of claim 13, wherein when executed by the central controller, the plurality of instructions cause said central controller to discard said gaming terminal generated random number if said game outcome set does not include at least one predetermined game outcome based on said random number.

15. The central determination gaming system of claim 14, wherein when executed by the central controller, the plurality of instructions cause said central controller to receive at least one additional gaming terminal generated random number from said gaming terminal if said game outcome set does not include at least one predetermined game outcome based on said random number.

16. The central determination gaming system of claim 13, wherein when executed by the central controller, the plurality of instructions cause the central controller to maintain a plurality of game outcome sets.

17. The central determination gaming system of claim 13, wherein when executed by the central controller, the plurality of instructions cause said central controller to receive a game outcome request from said gaming terminal wherein said game outcome request includes said gaming terminal generated random number.

18. The central determination gaming system of claim 13, wherein when executed by the central controller, the plurality of instructions cause said central controller to receive a plurality of gaming terminal generated random numbers from a plurality of gaming terminals which are remote from the central controller, to determine if said game outcome set includes one of the predetermined game outcomes based on each of said plurality of random numbers and to select said plurality of predetermined game outcomes from said game outcome set for said plurality of gaming terminals.

19. A central determination gaming system comprising:

a central controller; and a memory device which stores a plurality of instructions, which when executed by the central controller, cause the central controller to:

(a) a game outcome set, wherein said game outcome set includes a plurality of predetermined game outcomes and at least two of said predetermined game outcomes are different, (b) receive at least one random number from a gaming terminal which is remote from the central controller, (c) use said random number to determine if said game outcome set includes at least one predetermined game outcome based on said random number, (d) select one of said predetermined game outcomes for a primary wagering game from said game outcome set if said game outcome set includes said predetermined game outcome wherein said random number is used as an input to determine the selected game outcome, (e) prevent said selected predetermined game outcome from further selection from said game outcome set, and (f) communicate said selected predetermined game outcome to said gaming terminal, wherein said gaming terminal includes a display device and a processor in communication with said display device operable to:

(i) a player to initiate said primary wagering game, (ii) generate said random number, (iii) communicate said random number to said central controller (iv) said selected predetermined game outcome from said central controller, and (v) said predetermined game outcome to the player for said primary wagering game.

20. The central determination gaming system of claim 19, wherein when executed by the central controller, the plurality of instructions cause the central controller to maintain a plurality of game outcome sets.

21. The central determination gaming system of claim 19, wherein when executed by the central controller, the plurality of instructions cause said central controller to discard said random number if said game outcome set does not include at least one predetermined game outcome based on said random number.

22. The central determination gaming system of claim 19, wherein when executed by the central controller, the plurality of instructions cause said central controller to receive at least one random number from each of a plurality of gaming terminals that are remote from the central controller and to determine if said game outcome set includes an game outcome based on the random number for each gaming terminal.

23. A central determination gaming system comprising:

a central controller;

a memory device which stores a plurality of instructions, which when executed by the central controller, cause the central controller to:

(a) a game outcome set, wherein said game outcome set includes a plurality of predetermined game outcomes and at least two of said predetermined game outcomes are different, (b) receive at least one random number, (c) use said random number to determine if said game outcome set includes at least one predetermined game outcome based on said random number, (d) select one of said predetermined game outcomes from said game outcome set based on said random number if said game outcome set includes said predetermined game outcome, wherein said random number is used as an input to determine the selected predetermined game outcome, (e) prevent said selected predetermined game outcome from further selection from said game outcome set, (f) output said selected predetermined game outcome, and (g) discard said random number if said game outcome set does not include said predetermined game outcome based on said random number; and at least one gaming terminal which is remote from the central controller, said at least one gaming terminal including a display device, an input device, a processor and a gaming terminal memory device which stores a plurality of instructions, which when executed by the processor, cause the processor to operate with said display device and said input device to:

(i) enable a player to initiate a primary wagering game, (ii) generate said random number, (iii) communicate said generated random number to said central controller, (iv) receive said selected predetermined game outcome from said central controller, and (V) provide said predetermined game outcome to the player for said primary wagering game.

24. The central determination gaming system of claim 23, wherein when executed by the central controller, the plurality of instructions cause the central controller to maintain a plurality of game outcome sets.

25. The central determination gaming system of claim 23, wherein when executed by the central controller, the plurality of instructions cause said central controller to receive a plurality of random numbers from a plurality of gaming terminals which are remote from the central controller.

26. A central determination gaming system comprising:

a central controller; and a memory device which stores a plurality of instructions, which when executed by the central controller, cause the central controller to:

(a) a game outcome seed set, wherein said game outcome seed set includes a plurality of predetermined game outcome seeds, each predetermined game outcome seed is deterministic of a predetermined game outcome and at least two predetermined game outcome seeds are deterministic of different predetermined game outcomes, (b) receive a random number from a gaming terminal which is remote from the central controller, (c) select one of said predetermined game outcome seeds for a wagering game from said game outcome seed set, wherein said random number is used as an input to determine the selected predetermined game outcome seed, (d) prevent said selected predetermined game outcome seed from further selection from said game outcome seed set, and (e) communicate said selected predetermined game outcome seed to said gaming terminal, wherein said gaming terminal includes a display device and a processor in communication with said display device, operable to:

(i) enable a player to initiate said wagering game, (ii) generate said random number, (iii) communicate said random number to said central controller, (iv) receive said selected predetermined game outcome seed from said central controller, (v) determine a game outcome based on said selected predetermined game outcome seed, and (vi) provide said determined game outcome to the player for said wagering game.

27. The central determination gaming system of claim 26, wherein when executed by the central controller, the plurality of instructions cause the central controller to maintain a plurality of game outcome seed sets.

28. The central determination gaming system of claim 26, wherein when executed by the central controller, the plurality of instructions cause said central controller to receive at least one random number from each of a plurality of gaming terminals that are remote from the central controller and to select a game outcome seed, wherein each random number for each gaming terminal is used as an input to determine the selected predetermined game outcome seed.

29. The central determination gaming system of claim 26, wherein when executed by the central controller, the plurality of instructions cause said central controller to use said random number to determine if said game outcome seed set includes at least one predetermined game outcome seed based on said random number.

30. The central determination gaming system of claim 29, wherein when executed by the central controller, the plurality of instructions cause said central controller to discard said random number if said game outcome seed set does not include at least one predetermined game outcome seed based on said random number.

31. A central determination gaming system comprising:

a central controller;

a memory device which stores a plurality of instructions, which when executed by the central controller, cause the central controller to:

(a) a game outcome seed set, wherein said game outcome seed set includes a plurality of predetermined game outcome seeds, each predetermined game outcome seed is deterministic of a predetermined game outcome and at least two predetermined game outcome seeds are deterministic of different predetermined game outcomes, (b) receive at least one random number, (c) select one of said game outcome seeds from said game outcome seed set, wherein said random number is used as an input to determine the selected predetermined game outcome seed, (d) prevent said selected predetermined game outcome seed from further selection from said game outcome seed set, and (e) output said selected predetermined game outcome seed; and at least one gaming terminal which is remote from the central controller, said at least one gaming terminal including a display device, an input device, a processor and a gaming terminal memory device which stores a plurality of instructions, which when executed by the processor, cause the processor to operate with said display device and said input device to:

(i) enable a player to initiate a wagering game, (ii) generate said random number, (iii) communicate said generated random number to said central controller, (iv) receive said selected predetermined game outcome seed from said central controller, (v) determine a game outcome based on said selected game outcome seed, and (vi) provide said determined game outcome to the player for said wagering game.

32. The central determination gaming system of claim 31, wherein when executed by the central controller, the plurality of instructions cause the central controller to maintain a plurality of game outcome seed sets.

33. The central determination gaming system of claim 31, wherein when executed by the central controller, the plurality of instructions cause said central controller to use said random number to determine if said game outcome seed set includes at least one predetermined game outcome seed based on said random number.

34. The central determination gaming system of claim 33, wherein when executed by the central controller, the plurality of instructions cause said central controller to discard said random number if said game outcome seed set does not include at least one predetermined game outcome seed based on said random number.

35. A central determination gaming system comprising:

a central controller;

a memory device which stores a plurality of instructions, which when executed by the central controller, cause the central controller to:

(a) a game outcome set, wherein said game outcome set includes a plurality of predetermined game outcomes and at least two of said predetermined game outcomes are different, (b) receive at least one random number, (c) determine a game outcome, wherein said random number is used as an input to determine the game outcome, (d) determine if said game outcome set includes at least one predetermined game outcome based on said determined game outcome, (e) output said random number if said game outcome set includes said determined game outcome, (f) prevent said determined game outcome from further outputs if said game outcome set includes said determined game outcome, and (g) discard said random number and said determined game outcome if said game outcome set does not include said determined game outcome; and at least one gaming terminal which is remote from the central controller, said at least one gaming terminal including a display device, an input device, a processor and a gaming terminal memory device which stores a plurality of instructions, which when executed by the processor, cause the processor to operate with said display device and said input device to:

(i) enable a player to initiate a wagering game, (ii) generate said random number, (iii) communicate said generated random number to said central controller, (iv) receive said outputted random number from said central controller, (v) generate a game outcome based on said outputted random number, and (vi) provide said generated game outcome to the player for said wagering game.

36. A gaming terminal comprising:

a display device;

a processor;

an input device; and a memory device which stores a plurality of instructions, which when executed by the processor, cause the processor to operate with said display device and the input device to:

(a) enable a player to initiate a primary wagering game upon a wager by the player, (b) generate at least one random number, (c) output said generated random number to a central controller which is remote from said gaming terminal, (d) receive a predetermined game outcome from said central controller wherein said generated random number is used as an input to determine the predetermined game outcome which is selected from a game outcome set, the game outcome set includes a plurality of predetermined game outcomes and the selected predetermined game outcome is prevented from further selection from the game outcome set, and (e) provide said predetermined game outcome to the player for said wagering game.

37. A gaming terminal comprising:

a display device;

a processor;

an input device; and a memory device which stores a plurality of instructions, which when executed by the processor, cause the processor to operate with said display device and the input device to:

(a) enable a player to initiate a primary wagering game upon a wager by the player, (b) generate at least one random number, (c) output said generated random number to a central controller which is remote from said gaming terminal, (d) receive a predetermined game outcome seed from said central controller wherein said random number is used as an input to determine the game outcome seed which is selected from a game outcome seed set, the game outcome seed set includes a plurality of predetermined game outcome seeds and the selected predetermined game outcome seed is prevented from further selection from the game outcome seed set, (e) determine a predetermined game outcome based on said game outcome seed, and (f) provide said predetermined game outcome to the player for said wagering game.

38. A method of operating a central determination gaming system comprising the steps of:

(a) causing a central controller to execute a plurality of instructions to:

(i) receive a random number from a gaming terminal which is remote from the central controller;

(ii) select a predetermined game outcome from a predetermined game outcome set wherein said random number is used as an input to determine the selected predetermined game outcome;

(iii) prevent said selected predetermined game outcome from further selection from said game outcome set; and (iv) communicate said selected predetermined game outcome to said gaming terminal.

39. A method of operating a central determination gaming system comprising the steps of:

(a) causing a central controller to execute a plurality of instructions to:

(i) receive at least one random number from a gaming terminal which is remote from the central controller;

(ii) use said random number to determine if a predetermined game outcome set includes at least one predetermined game outcome based on said random number;

(iii) if said game outcome set includes at least one predetermined game outcome based on said random number, select one of said predetermined game outcomes from said game outcome set, wherein said random number is used as an input to determine the selected predetermined game outcome;

(iv) prevent said selected predetermined game outcome from further selection from said game outcome set, if said game outcome set includes at least one predetermined game outcome based on said random number;

(v) communicate said selected predetermined game outcome to said gaming terminal, if said game outcome set includes at least one predetermined game outcome based on said random number;

(vi) discard said random number if said game outcome set does not include at least one predetermined game outcome based on said random number; and (vii) repeat steps (i) to (vi), if said game outcome set does not include at least one predetermined game outcome based on said random number.

40. A method of operating a central determination gaming system comprising the steps of:

(a) causing a central controller to execute a plurality of instructions to:

(i) receive a random number from a gaming terminal which is remote from the central controller;

(ii) select a predetermined game outcome seed from a predetermined game outcome seed set wherein said random number is used as an input to determine the selected predetermined game outcome seed;

(iii) prevent said selected predetermined game outcome seed from further selection from said game outcome seed set; and (iv) communicate said selected predetermined game outcome seed to said gaming terminal.

41. A method of operating a central determination gaming system comprising the steps of:

(a) causing a central controller to execute a plurality of instructions to:

(i) receive at least one random number from a gaming terminal which is remote from the central controller;

(ii) use said random number to determine if a predetermined game outcome seed set includes at least one predetermined game outcome seed based on said random number;

(iii) if said game outcome seed set includes at least one game outcome seed based on said random number, select one of said predetermined game outcome seeds from said game outcome seed set, wherein said random number is used as an input to determine the selected predetermined game outcome seed;

(iv) prevent said selected predetermined game outcome seed from further selection from said game outcome seed set, if said game outcome seed set includes at least one predetermined game outcome seed based on said random number;

(v) communicate said selected predetermined game outcome seed to said gaming terminal, if said game outcome seed set includes at least one predetermined game outcome seed based on said random number;

(vi) discard said random number if said game outcome seed set does not include at least one predetermined game outcome seed based on said random number; and (vii) repeat steps (i) to (vi), if said game outcome seed set does not include at least one predetermined game outcome seed based on said random number.

42. A method of operating a central determination gaming system comprising the steps of:

(a) causing a central controller to execute a plurality of instructions to:

(i) receive at least one random number from a gaming terminal which is remote from the central controller;

(ii) determine a game outcome, wherein said random number is used as an input to determine the game outcome;

(iii) determine if a predetermined game outcome set includes said determined game outcome;

(iv) select said determined outcome from said game outcome set if said predetermined game outcome set includes said determined game outcome;

(v) prevent said selected game outcome from further selection from said predetermined game outcome set if said game outcome set includes said determined game outcome;

(vi) communicate said selected game outcome to said gaming terminal if said predetermined game outcome set includes said determined game outcome;

(vii) discard said random number if said predetermined game outcome set does not include said determined game outcome;

(viii) discard said determined game outcome if said predetermined game outcome set does not include said determined game outcome; and (ix) repeat steps (i) to (viii), if said predetermined game outcome set does not include said determined game outcome.

43. A method of operating a gaming terminal including at least one processor and a plurality of instructions, said method comprising:

(a) enabling a player to initiate a wagering game;

(b) causing said at least one processor to execute the plurality of instructions to generate at least one random number;

(c) causing said at least one processor to execute the plurality of instructions to communicate said random number to a central controller which is remote from said gaming terminal;

(d) receiving a predetermined game outcome from said central controller wherein said random number is used as an input to determine the predetermined game outcome which is selected from a game outcome set, the game outcome set includes a plurality of predetermined game outcomes and the selected predetermined game outcome is prevented from further selection from the game outcome set; and (e) providing said predetermined game outcome to said player for said wagering game.

44. A method of operating a gaming terminal including at least one processor and a plurality of instructions, said method comprising:

(a) enabling a player to initiate a wagering game;

(b) causing said at least one processor to execute the plurality of instructions to generate at least one random number; (c) causing said at least one processor to execute the plurality of instructions to communicate random number to a central controller which is remote from said gaming terminal;

(d) receiving a predetermined game outcome seed from said central controller wherein said random number is used as an input to determine the predetermined game outcome seed which is selected from a game outcome seed set, the game outcome seed set includes a plurality of predetermined game outcome seeds and the selected predetermined game outcome seed is prevented from further selection from the game outcome seed set;

(e) causing said at least one processor to execute the plurality of instructions to determine a predetermined game outcome based on said game outcome seed; and (f) providing said determined game outcome to said player for said wagering game.

* * * * *

UNITED STATES PATENT AND TRADEMARK OFFICE

CERTIFICATE OF CORRECTION

PATENT NO. : 7,628,703 B2
APPLICATION NO. : 10/431755
DATED : December 8, 2009
INVENTOR(S) : Wolf et al.

It is certified that error appears in the above-identified patent and that said Letters Patent is hereby corrected as shown below:

On the Title Page, delete "854 days"

Item (*) Notice should read: Subject to any disclaimer, the term of this patent is extended or adjusted under 35 U.S.C. 154(b) 1176 days.

In Claim 19, Column 19, Line 26, insert --maintain-- between "(a)" and "a".

In Claim 19, Column 19, Line 47, insert --enable-- between "(i)" and "a".

In Claim 19, Column 19, Line 50, insert --,-- after controller.

In Claim 19, Column 19, Line 51, insert --receive-- between "(iv)" and "said".

In Claim 19, Column 19, Line 53, insert --provide-- between "(v)" and "said".

In Claim 23, Column 20, Line 10, insert --maintain-- between "(a)" and "a".

In Claim 23, Column 20, Line 44, change "(V)" to --(v)--.

In Claim 26, Column 20, Line 61, insert --maintain-- between "(a)" and "a".

In Claim 31, Column 21, Line 56, insert --maintain-- between "(a)" and "a".

In Claim 35, Column 22, Line 44, insert --maintain-- between "(a)" and "a".

Signed and Sealed this

Thirty-first Day of August, 2010

David J. Kappos

*Director of the United States Patent and Trademark Office*